Figure 1:
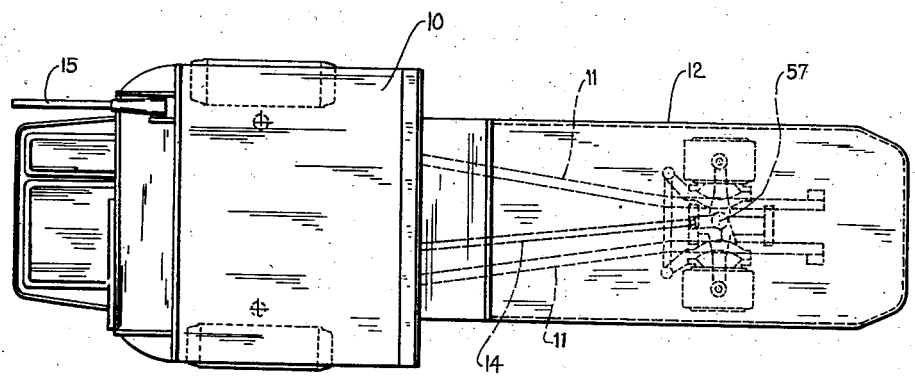

Sept. 19, 1939.  B. ULINSKI  2,173,737
WHEEL CONSTRUCTION
Filed April 1, 1936     3 Sheets—Sheet 1

INVENTOR
B. Ulinski
BY A. H. Golden
ATTORNEY

Sept. 19, 1939.   B. ULINSKI   2,173,737
WHEEL CONSTRUCTION
Filed April 1, 1936   3 Sheets-Sheet 2
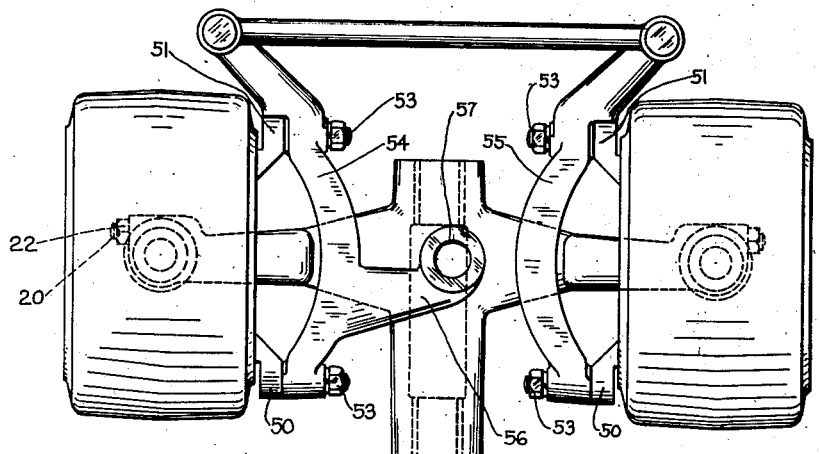
Fig. 3
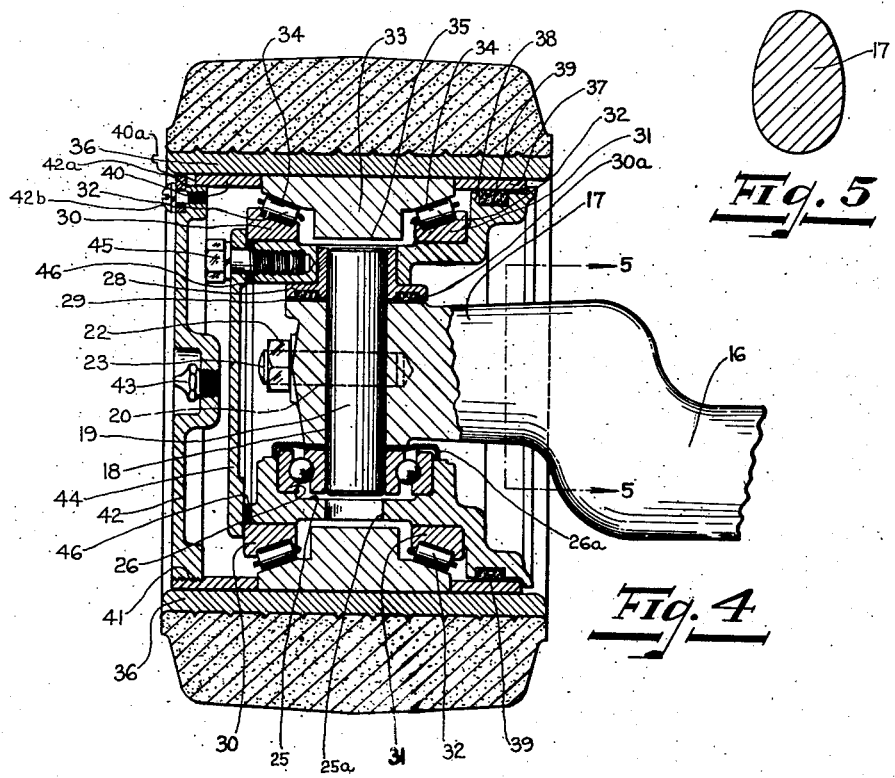
Fig. 5
Fig. 4
INVENTOR
B. Ulinski
BY
A. H. Golden
ATTORNEY Sept. 19, 1939.  B. ULINSKI  2,173,737
WHEEL CONSTRUCTION
Filed April 1, 1936  3 Sheets-Sheet 3

INVENTOR
B. Ulinski
BY
H. Golden
ATTORNEY

Patented Sept. 19, 1939

2,173,737

UNITED STATES PATENT OFFICE 2,173,737

WHEEL CONSTRUCTION

Bronislaus Ulinski, Chicago, Ill., assignor to The Yale & Towne Manufacturing Company, Stamford, Conn., a corporation of Connecticut Application April 1, 1936, Serial No. 72,110

9 Claims. (Cl. 280—96.3)

This invention relates to a wheel mounting especially adapted for industrial trucks. More particularly, the invention relates to the mounting of the small load supporting and steering wheels of an industrial truck about a center king pin.

Industrial trucks of the type generally used in factories for carrying heavy loads are usually equipped with small load supporting and steering wheels. The wheels are of very small diameter, because they are adapted to rest under the load supporting platform, or under the main frame, the platform or main frame being required in industrial trucks to lie as close to the terrain as is possible.

It will be readily realized that the providing of mounting means for such wheels, including bearings for the easy steering of the wheels about a king pin, plus bearings about which the wheels may rotate, plus the extensive steering required for trucks used in the narrow aisles encountered in factories, presents quite a considerable number of problems. All of these problems, and many others, have been effectively solved by my invention.

I believe that it will probably be helpful, before describing in detail the construction of my wheel mounting assembly, to discuss generally the construction and operation thereof.

I have found that it is advisable to use a center king pin construction in mounting the steering and load wheels of an industrial truck assembly. By mounting the steering wheels for rotation about a center king pin, I eliminate all direct radial loads on the king pin about which the steering wheel rotates, and it becomes necessary for me to provide means for absorbing only such incidental radial loads as may occur. Thrust loads are transferred directly through the load axle to a thrust bearing mounted about the king pin axis. Because it is not necessary for me to design means to overcome direct radial loads, I am able to eliminate certain constructions, and therefore, to provide for a greater extent of steering of the wheels, while using exceedingly small diameter steering wheels.

As a feature of my design, I employ a stub axle somewhat elliptical in shape, with the long axis of the ellipse vertical so that a sleeve-like wheel supporting member mounted for rotation about a king pin carried by the axle, may have relatively great movement about the king pin for extensive steering. Also, I am able through my design, as will be explained hereinafter, to terminate my axle just slightly beyond the point where the king pin is mounted in the axle. This feature contributes also to the extension of the steering.

As I have already indicated, there is a sleeve-like wheel supporting member mounted for steering rotation about the king pin. This sleeve-like member has a lower cup-like thrust bearing supporting portion mounted on a horizontal chord of the inner circle outlined by the sleeve. Above this cup-like portion, there is an opening in the sleeve in which a bushing for the king pin is mounted.

On the outer periphery of the sleeve, I support the inner bearing races and the wheel supporting bearings, and these races are preferably adapted for adjustment by an end plate carried by the end surface of the sleeve and adjustable relatively to the end surface of the sleeve through means of shims. In this way, I facilitate greatly the adjustment of the bearing means.

In order to cut down the size of the wheels, I have devised a combination tire supporting rim and outer bearing race. Thus, I form the outer bearing race for the bearings previously described, so that it itself will support the regulation tire band on which the usual hard tire used in this industry is mounted. This is a rather novel contribution to the industrial truck art, and it permits for the cutting down of the wheel to a size not normally possible. At the same time, by particularly shaping my combination rim and outer bearing race, I form it of such strength that it will not be readily deformed because of its direct supporting of the tire band and tire.

In the industrial truck industry, most trucks are manufactured to meet particular material handling problems. Therefore, various steering arrangements are required, and various steering assemblies are necessary. In order to facilitate the manufacture of steering assemblies, I have devised a rather unique method and means for manufacturing steering arms and steering wheel assemblies, so that the steering wheel assemblies will be readily cooperable with any one of a number of types of different steering arms. The manufacturer is thus able to manufacture but a single type of steering wheel assembly, and any number of steering arms that he may require. He may, at will, unite the single type of steering wheel assembly with any one of the different types of arms he has on hand, and thus obtain a particular steering assembly which may be required.

While I have indicated thus generally the various salient features of my invention, there are of course many other advantages inherent in my construction which will be described in the specification which follows. It may be well to indicate at this time that I consider my invention to be of a very broad scope, and that I believe myself entitled to rather broad claims covering the invention in such scope as to prevent the substantial adoption of my contribution to the art by others.

Figure 2:
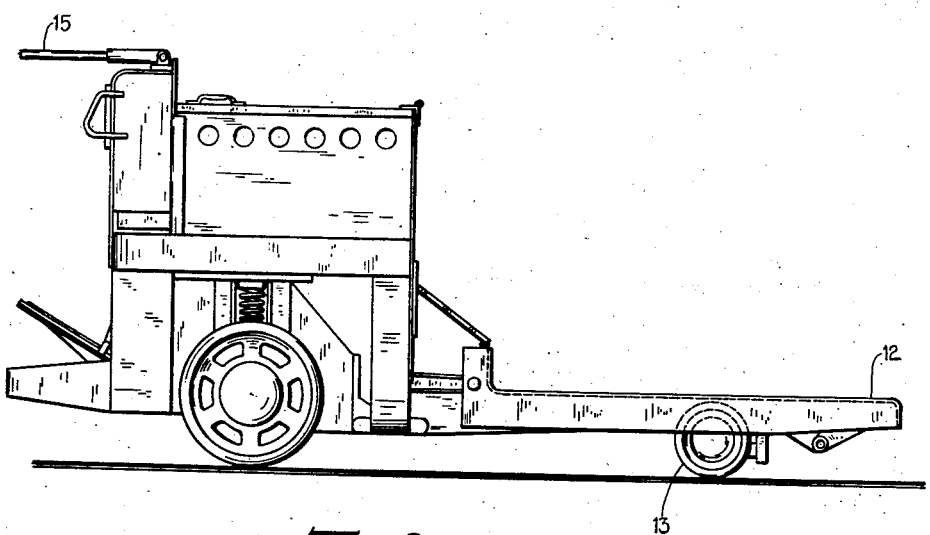
Figure 6:
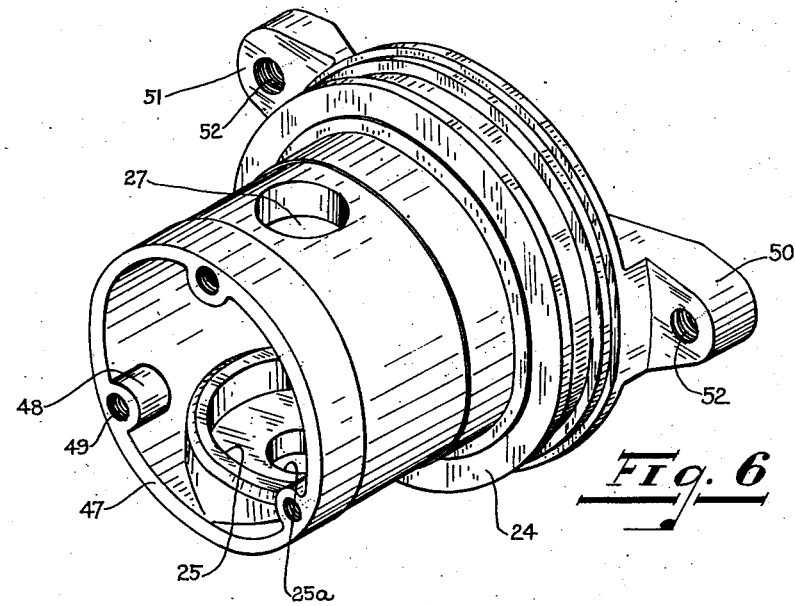
Figure 7:
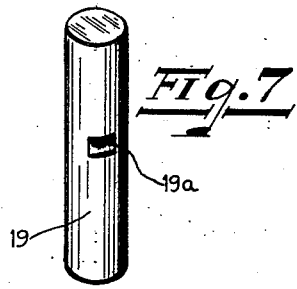
Figures 8, 9:
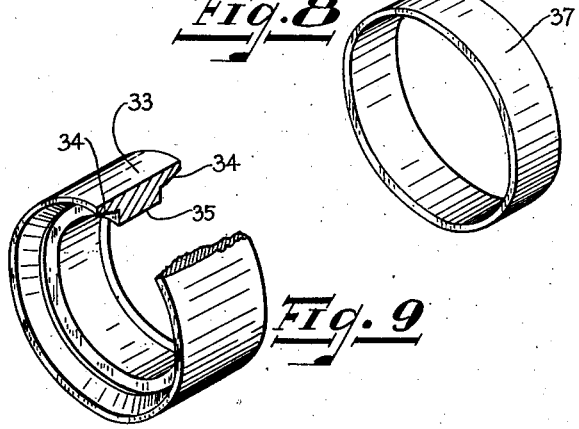
Figure 10:
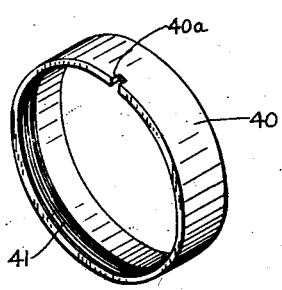
Figure 11:
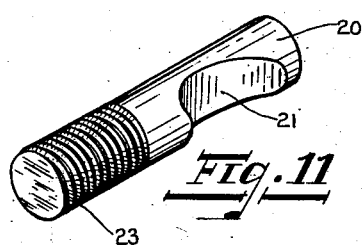

I shall now refer to the drawings wherein I show a preferred embodiment of my invention. In the drawings, Fig. 1 is a view looking down on a usual type of industrial truck. Fig. 2 is a side view of the industrial truck shown in Fig. 1. Fig. 3 is a view looking down on the steering and load supporting wheel assembly of Fig. 1. Fig. 4 is a transverse vertical cross section through one of the wheel assemblies of Fig. 3. Fig. 5 is a cross-section of Fig. 4 taken along lines 5—5. Fig. 6 is a perspective view of the sleeve-like wheel supporting member. Fig. 7 is a perspective view of my king pin. Fig. 8 is a perspective view of a wedging ring. Fig. 9 is a perspective view of the combination tire supporting member and outer race. Fig. 10 is a view of the outer wedging ring, while Fig. 11 is a perspective view of the pin which holds the king pin in the axle.

Referring now more particularly to the drawings, reference numeral 10 in Fig. 1 designates a usual type of industrial truck having a horizontally extending main frame 11 supporting a load platform 12 which is preferably of a type adapted to be elevated relatively to the main frame. It is readily seen that the platform is adapted to occupy a relatively low position, and that therefore the load supporting and steering wheels 13 which are mounted under the platform 12 must be of relatively small diameter. These wheels are adapted to be steered by a rod 14 shown in Fig. 1 which, through a series of connections, is manipulated by a handle 15 mounted for easy actuation by the operator. The various parts so far described are well known and are found in practically all industrial trucks. They are set forth here and are shown merely to present a background for the detailed description of my invention which follows.

Referring now more particularly to Figs. 4-11, inclusive, the load supporting axle of my truck is designated by reference numeral 16 in Fig. 4, and has a stub axle portion 17 of substantially elliptical shape, as shown in Fig. 5. The axle is bored out at 18 for the insertion of a king pin 19, illustrated in Fig. 7. The king pin 19 is held in the bore 18 against rotation, and against other movement, by a holding pin 20, illustrated in Fig. 11. The holding pin 20 has a mutilated arc shaped portion 21 cooperable with a mutilated flat milled portion 19a on the king pin 19, whereby it is adapted to lock the king pin 19 in position when the nut 22 of the screw threaded portion 23 of the holding pin 20 is tightened, so as to move the holding pin 20 horizontally and to force its mutilated portion 21 against the mutilated flat portion 19a of the king pin.

A wheel supporting sleeve-like member 24 shown in Fig. 6 is mounted for rotation about the king pin 19. Formed on the inner circle defined by the sleeve-like member 24, and on a chord of said circle, is a hollow cup-like portion 25 adapted to support a thrust bearing 26 on the axis of the king pin 19 for absorbing the thrust loads on the stub axle 17, as is best shown in Fig. 4. In this way, the thrust loads are imparted to the sleeve-like member 24 and its bearing 26 directly from the axle 17. Below the cup-like portion 25 there is an opening 25a through which the king pin may be contacted when it is desired to remove it. A cover 26a is provided for the thrust bearing 26 and protects the bearing, as will be readily appreciated. The sleeve is bored out as at 27 above the cup-like portion 25 to accommodate a bushing 28 in which the upper portion of the king pin 19 is mounted. Gaskets 29 and 30a lie between the under surface of the bushing 28 and a flattened upper surface of the stub axle 17.

Circular bearing races 30 and 31 are mounted on the outer periphery of the sleeve 24, and these races are preferably tapered for supporting roller bearings 32. Naturally, ball bearings or other types of bearings could readily be used if desired. Cooperating with the roller bearings 32 is an outer bearing race 33 shown in perspective in Fig. 9. This outer race has tapered surfaces 34 for cooperation with the roller bearings 32, and has a central lug portion 35 adapted to lie between the races 30 and 31. The portion 35 adds to the strength of the bearing race 33, which bearing race is adapted to function also as a tire supporting member or rim.

A metal tire band 36 of the type carrying a hard tire, and generally sold to the industrial truck industry, is adapted to be pressed or forced on to the outer periphery of the member or rim 33, as is best shown in Fig. 4. It is thus readily seen that the member 33 is really a combined tire carrying rim and an outer bearing race and serves therefore to cut down considerably the size of the wheel without any sacrifice in the strength of the wheel. It will also be observed that the central portion of the member 33 is directly over the king pin 19, and that the tire is mounted so that its central portion is centrally aligned relatively to the king pin 19, to provide for center king pin steering so that in the regular travel of the truck, there are no radial thrusts on the king pin 19.

The tire band 36 is adapted to extend beyond the supporting member 33 at both sides thereof. To reinforce the tire band at its inner side, there is forced into engagement therewith a ring 37, shown in Fig. 8, which ring is separated from a stepped portion 38 of the sleeve-like member 24 by a gasket 39. At its outer side, the tire band 36 is reinforced by a ring 40, which ring in turn is screw threaded at 41 for supporting a threaded reinforcing cover plate 42 equipped with a lubrication member 43, whereby lubricating material may be entered into the assembly. The cover plate is preferably locked against release rotation on threads 41 by a locking lug 42a held on cover plate 42 by a bolt 42b and resting in a slot 40a in ring 41.

For adjusting the roller bearings 32 through races 30 and 31, I utilize an adjusting plate 44 which also acts as an inner cover. It is supported by a series of three bolts 45, and through shims 46, relatively to the end surface 47 of the sleeve 24, which end surface is equipped with a series of lugs 48, each screw threaded at 49 for the bolts 45. It is quite obvious that by placing more or less shims between the adjusting plate 44 and the end surface 47 of the sleeve 24, it is possible to move the bearing races and to adjust them as may be required.

As was also previously indicated generally, it is desirable to obtain in the truck industry a large number of available steering assemblies, while using but a single type of steering wheel. I am able to obtain this result by providing my sleeve member 24 with a pair of lugs 50 and 51, screw threaded at 52 for cooperation with cooperating studs and nuts 53 carried by steering arms 54 and 55, best illustrated in Fig. 3. It will be noted that the steering arm 54 has an extending arm 56 adapted to be connected to the rod 41 at 57, as is best illustrated in Fig. 1. It will also be noted that the arm 55 does not have this extension 56.

Thus, even in the simple illustration which I have presented to describe my invention, it is quite easily seen that by this particular feature, I am able to obtain both a right and a left steering assembly, as illustrated in Fig. 3, while using but one type of sleeve member 24. It is only the steering arms which are of different form. I believe that the operation of my invention will now be quite clear to those skilled in the art, and that further details will be found unnecessary.

I now claim:

1. In a wheel assembly of the class described, a wheel supporting member, an inner bearing race of a wheel supporting bearing mounted thereon, bearings on said race, a tire carrying rim having an inner surface formed as an outer bearing race and mounted on said bearings, a tire supporting band forced on said rim and extending beyond the edge of said rim, a ring forced against the inner surface of the extending tire band, and a cover plate for the assembly carried by said ring.

2. In a wheel assembly of the class described, a sleeve-like wheel supporting member, an inner bearing race of a wheel supporting bearing mounted thereon, said bearing race having a portion extending beyond the outer end surface of said sleeve, a circular bearing adjusting plate carried by said sleeve and fitted against said outer extending bearing portion, and screw threaded means and shims between the outer end surface of said sleeve and said plate for securing said plate in a particular bearing adjusting position.

3. In a wheel assembly of the class described, a sleeve-like wheel supporting member, a pair of oppositely tapered inner bearing races of tapered wheel supporting bearings mounted on the outer periphery of said sleeve, a shoulder near the inner end of the sleeve against which the inner one of said bearing races rests, the outer one of said bearing races having a portion extending beyond the outer end surface of said sleeve, bearing means on said races, a single outer bearing race cooperable with the bearing means of both said races, a circular bearing adjusting plate fitted against said outer extending race portion, and screw threaded means and shims between the outer end surface of said sleeve and said plate for securing said plate in a particular bearing adjusting position.

4. In a wheel assembly of the class described, a sleeve-like wheel supporting member, a king pin, means whereby said member rotates about said king pin, a pair of inner bearing races of a wheel bearing mounted on the outer surface of the sleeve, one at each side of the king pin so as to position the king pin in the center of the wheel to be supported on said bearings, a single outer race cooperable with bearings carried by said pair of races and having a central shouldered portion lying between said pair of bearing races, a tire supporting band wedged directly on the outer bearing race and extending outwardly on each side of said race, a stepped portion of said sleeve-like member extending into juxtaposed relation to the outwardly extending band portion at the inner side of the tire, a ring and a gasket between said band and said stepped portion, a second ring forced against the inner surface of the tire band on the outer side of the tire, and a cover plate in screw threaded relation to said second ring.

5. In a wheel assembly of the class described, a sleeve-like wheel supporting member, bearings mounted on said member, a relatively narrow tire supporting rim rotatable on said bearings, a relatively wide tire supporting band on said rim and extending laterally from said rim, a ring forced against the inner surface of said laterally extending tire band, and a circular plate secured to the outer edge of said ring.

6. In a wheel assembly of the class described, a sleeve-like wheel supporting member, bearings mounted on said member, a relatively narrow tire supporting rim rotatable on said bearings, a relatively wide tire supporting band fitted on said rim and extending laterally from said rim at each side thereof, and a reinforcing ring for each laterally extending portion of said tire band forced against the inner surfaces of said laterally extending portions.

7. In a wheel assembly of the class described, a sleeve-like wheel supporting member, a king pin, means whereby said member rotates about said king pin, a pair of inner bearing races of a wheel bearing mounted on the outer surface of the sleeve, one at each side of the king pin so as to position the king pin in the center of the wheel to be supported on said bearings, a single outer race cooperable with bearings carried by said pair of races and having a central shouldered portion lying between said pair of bearing races, and a tire supporting band wedged directly on the outer bearing race.

8. In a wheel assembly of the class described, a sleeve-like wheel supporting member, a king pin, means whereby said member rotates about said king pin, a pair of inner bearing races of a wheel bearing mounted on the outer surface of the sleeve, one at each side of the king pin so as to position the king pin in the center of the wheel to be supported on said bearings, a single outer race cooperable with bearings carried by said pair of races and having a central shouldered portion lying between said pair of bearing races, a circular bearing adjusting plate carried by the end of said sleeve and fitted against the outer one of said pair of races, and screw threaded means between said plate and sleeve for adjusting the said bearings by varying the position of said plate relatively to said sleeve.

9. In a wheel assembly of the class described, a sleeve-like wheel supporting member, a king pin, means whereby said member rotates about said king pin, a pair of inner bearing races of a wheel bearing mounted on the outer surface of the sleeve, one at each side of the king pin so as to position the king pin in the center of the wheel to be supported on said bearings, a single outer race cooperable with bearings carried by said pair of races, and a tire supporting band wedged directly on the outer bearing race.

BRONISLAUS ULINSKI.